US009653796B2

(12) United States Patent
Pleva (10) Patent No.: US 9,653,796 B2
(45) Date of Patent: May 16, 2017

(54) STRUCTURE AND TECHNIQUE FOR ANTENNA DECOUPLING IN A VEHICLE MOUNTED SENSOR

(71) Applicant: Valeo Radar Systems, Inc., Hudson, NH (US)

(72) Inventor: Joseph S. Pleva, Londonderry, NH (US)

(73) Assignee: Valeo Radar Systems, Inc., Hudson, NH (US)

( * ) Notice: Subject to any disclaimer, the term of this patent is extended or adjusted under 35 U.S.C. 154(b) by 224 days.

(21) Appl. No.: 14/107,189

(22) Filed: Dec. 16, 2013

(65) Prior Publication Data
US 2015/0171511 A1 Jun. 18, 2015

(51) Int. Cl.
| H01Q 1/52 | (2006.01) |
| H01Q 9/04 | (2006.01) |
| H01Q 21/00 | (2006.01) |
| H01Q 17/00 | (2006.01) |
| G01S 7/02 | (2006.01) |
| G01S 13/93 | (2006.01) |

(52) U.S. Cl.
CPC .......... *H01Q 1/526* (2013.01); *G01S 13/931* (2013.01); *H01Q 1/52* (2013.01); *H01Q 9/0407* (2013.01); *H01Q 17/00* (2013.01); *H01Q 21/0006* (2013.01); *G01S 2007/027* (2013.01); *G01S 2013/9371* (2013.01)

(58) Field of Classification Search
CPC ....................................... H01Q 1/526
USPC .......................................... 343/841
See application file for complete search history.

(56) References Cited

U.S. PATENT DOCUMENTS

| 2,540,839 A | 2/1951 | Southworth |
| 4,286,236 A | 8/1981 | Fischer |
| 4,322,778 A | 3/1982 | Barbour et al. |
| 4,534,602 A | 8/1985 | Bley |
| 4,771,294 A | 9/1988 | Wasilousky |
| 5,008,678 A | 4/1991 | Herman |
| 5,138,436 A | 8/1992 | Koepf |
| 5,194,823 A | 3/1993 | Wendt et al. |
| 5,252,981 A | 10/1993 | Grein et al. |

(Continued)

FOREIGN PATENT DOCUMENTS

| DE | 10 2009 042 285 A1 | 3/2011 |
| DE | 10 2011 122 346 A1 | 6/2013 |

(Continued)

OTHER PUBLICATIONS

Lohinetong et al.: "Microstrip to Surface Mounted Foam-Based Waveguide Transition for Ka-Band Filter Integration;" 2004 4$^{th}$ International Conference on Microwave and Millimeter Wave Technology Proceedings; IEEE vol. 1; Oct. 11, 2004; ISBN: 978-0-7803-8401-9; pp. 899-902 (4 pages).

(Continued)

*Primary Examiner* — Dameon E Levi
*Assistant Examiner* — Walter Davis
(74) *Attorney, Agent, or Firm* — Daly, Crowley, Mofford & Durkee, LLP (57) ABSTRACT

Presently disclosed is a structure and technique for decoupling a sensor (such as an automotive radar sensor), from a surrounding electrically conductive structure (such as a vehicle) on which the sensor is mounted.

18 Claims, 7 Drawing Sheets

(56) References Cited

U.S. PATENT DOCUMENTS

| | | | |
|---|---|---|---|
| 5,363,075 A | 11/1994 | Fanucchi | |
| 5,414,394 A | 5/1995 | Gamand et al. | |
| 5,451,818 A | 9/1995 | Chan et al. | |
| 5,512,901 A | 4/1996 | Chen et al. | |
| 5,592,178 A | 1/1997 | Chang et al. | |
| 5,680,080 A | 10/1997 | Nishiyama et al. | |
| 5,708,433 A | 1/1998 | Craven | |
| 5,727,023 A | 3/1998 | Dent | |
| 5,760,749 A | 6/1998 | Minowa et al. | |
| 5,912,598 A | 6/1999 | Stones et al. | |
| 6,039,580 A | 3/2000 | Sciarretta et al. | |
| 6,107,956 A | 8/2000 | Russell et al. | |
| 6,137,688 A | 10/2000 | Borkar et al. | |
| 6,167,286 A | 12/2000 | Ward et al. | |
| 6,198,449 B1 | 3/2001 | Muhlhauser et al. | |
| 6,218,987 B1 | 4/2001 | Derneryd et al. | |
| 6,249,242 B1 | 6/2001 | Sekine et al. | |
| 6,265,950 B1 | 7/2001 | Schmidt et al. | |
| 6,324,755 B1 | 12/2001 | Borkowski et al. | |
| 6,463,303 B1 | 10/2002 | Zhao | |
| 6,466,101 B2 | 10/2002 | Tanji | |
| 6,489,927 B2 | 12/2002 | LeBlanc et al. | |
| 6,492,949 B1 | 12/2002 | Breglia et al. | |
| 6,496,138 B1 | 12/2002 | Honma | |
| 6,501,415 B1 | 12/2002 | Viana et al. | |
| 6,577,269 B2 | 6/2003 | Woodington et al. | |
| 6,577,879 B1 | 6/2003 | Hagerman et al. | |
| 6,603,915 B2 | 8/2003 | Glebov et al. | |
| 6,614,389 B2 | 9/2003 | Suzuki et al. | |
| 6,642,908 B2 | 11/2003 | Pleva et al. | |
| 6,683,557 B2 | 1/2004 | Pleva et al. | |
| 6,693,557 B2 | 2/2004 | Arnold et al. | |
| 6,738,017 B2 | 5/2004 | Jacomb-Hood | |
| 6,784,838 B2 | 8/2004 | Howell | |
| 6,794,950 B2 | 9/2004 | Du Toit et al. | |
| 6,864,699 B2 | 3/2005 | Sakayori et al. | |
| 6,933,900 B2 | 8/2005 | Kitamori et al. | |
| 6,965,816 B2 | 11/2005 | Walker | |
| 6,995,730 B2 | 2/2006 | Pleva et al. | |
| 7,038,608 B1 | 5/2006 | Gilbert | |
| 7,132,905 B2 | 11/2006 | Sano | |
| 7,148,766 B2 | 12/2006 | Tong et al. | |
| 7,183,995 B2 | 2/2007 | Pleva et al. | |
| 7,212,698 B2 | 5/2007 | Bapst et al. | |
| 7,231,881 B2 | 6/2007 | Nelson | |
| 7,248,215 B2 | 7/2007 | Pleva et al. | |
| 7,336,141 B2 | 2/2008 | Mueller | |
| 7,336,219 B1 | 2/2008 | Lohmeier et al. | |
| 7,345,619 B2 | 3/2008 | Hunt | |
| 7,379,018 B1 | 5/2008 | Lohmeier et al. | |
| 7,400,290 B2 | 7/2008 | Woodington et al. | |
| 7,403,153 B2 | 7/2008 | Kelly, Jr. et al. | |
| 7,603,097 B2 | 10/2009 | Leblanc et al. | |
| 7,656,362 B2 | 2/2010 | Alberding et al. | |
| 7,680,464 B2 | 3/2010 | Pleva et al. | |
| 7,881,689 B2 * | 2/2011 | Leblanc | G01S 7/032 342/70 |
| 2003/0174479 A1 | 9/2003 | Shimura et al. | |
| 2003/0210179 A1 | 11/2003 | Dizaji et al. | |
| 2004/0027305 A1 | 2/2004 | Pleva et al. | |
| 2004/0119564 A1 | 6/2004 | Itoh et al. | |
| 2004/0164892 A1 | 8/2004 | Shinoda et al. | |
| 2004/0203289 A1 | 10/2004 | Ice et al. | |
| 2004/0208249 A1 | 10/2004 | Risbo et al. | |
| 2006/0125682 A1 | 6/2006 | Kelly, Jr. et al. | |
| 2006/0145778 A1 | 7/2006 | Pleva et al. | |
| 2006/0152406 A1 | 7/2006 | Leblanc et al. | |
| 2007/0120731 A1 | 5/2007 | Kelly, Jr. et al. | |
| 2007/0152869 A1 | 7/2007 | Woodington et al. | |
| 2007/0152870 A1 | 7/2007 | Woodington et al. | |
| 2007/0152872 A1 | 7/2007 | Woodington | |
| 2007/0152873 A1 | 7/2007 | Hunt | |
| 2007/0152874 A1 | 7/2007 | Woodington | |
| 2007/0156799 A1 | 7/2007 | Gilbert | |
| 2008/0001809 A1 | 1/2008 | Woodington et al. | |
| 2008/0018523 A1 | 1/2008 | Kelly, Jr. et al. | |
| 2009/0256777 A1 | 10/2009 | Nagai | |
| 2010/0238066 A1 | 9/2010 | Lohmeier et al. | |
| 2011/0291908 A1 * | 12/2011 | Hook | H01Q 21/061 343/841 |
| 2013/0321214 A1 | 12/2013 | Zhou et al. | |

FOREIGN PATENT DOCUMENTS

| | | |
|---|---|---|
| EP | 1 233 471 A2 | 8/2002 |
| EP | 1 367 668 A1 | 12/2003 |
| EP | 1 471 598 A1 | 10/2004 |
| EP | 1 674 882 A1 | 6/2006 |
| EP | 1 777 551 A2 | 4/2007 |
| EP | 1 804 075 A2 | 7/2007 |
| EP | 1 804 075 A3 | 7/2007 |
| GB | 2 292 484 A | 2/1996 |
| GB | 2 381 666 A | 5/2003 |
| GB | 2 413 703 B | 3/2007 |
| WO | WO 2004/044610 A1 | 5/2004 |
| WO | WO 2005/093828 A1 | 10/2005 |

OTHER PUBLICATIONS

Picard et al.; "LTCC Transistion and Embedded Bandpass Filter for LMDS Applications;" 2004 Microwave Conference; IEEE vol. 1; Oct. 11, 2004; ISBN: 978-1-58053-922-0; pp. 389-392 (4 pages).

Gao et al.: "Adaptive Linearization Schemes for Weakly Nonlinear Systems Using Adaptive Linear and Nonlinear FIR Filters;" Dept. of Electrical Engineering, University of Toronto; IEEE; Jan. 1991; CH2819-1/90/0000-0009; pp. 9-12 (4 pages).

Lin et al.; "A High Speed Low-Noise Equilization Technique with Improved Bit Error Rate;" EEE; Jul. 2002; 0-7803-7448; pp. 564-567(4 pages).

Nordsjo; "An Algorithm for Adaptive Predisortion of Certain Time-Varying Nonlinear High-Power Ampiifiers;" 2002 The Institution of Electrical Engineers; XP-002364938; pp. 469-473 (5 pages).

Mueller, "SMD-Type 42 GHz Waveguide Filter," IEEE Jan. 2003; 0-7803-7695; pp. 1089-1092 (4 pages).

Cheng, "A Fast Hybrid MoM/FEM Technique for Microstripline Vertical Couplers with Muitipie Identical Cavities;" IEEE Jun. 2003; 0-7803-7846; pp. 1076-1079 (4 pages).

EP Search Report and Written Opinion of the European Patent Office for EP 05 11 1991.5; dated Mar. 2, 2006 (8 pages).

EP Report and Written Opinion of the European Patent Office for EP 05 111 983.2 dated Apr. 7, 2006 (6 pages).

PCT Search Report and Written Opinion of the ISA for PCT/US2007/088063 dated Apr. 28, 2008 (11 pages).

EP Search Report and Written Opinion of the European Patent Office for EP 05 11 1994.9 dated Mar. 31, 2006, (8 pages).

U.S. Appl. No. 11/323,816, now U.S. Pat. No. 7,603,097; 517 pages.

U.S. Appl. No. 12/363,949, now U.S. Pat. No. 7,881,689; 364 pages.

U.S. Appl. No. 11/027,523, now U.S. Pat. No. 7,680,464: 546 pages.

Search Report and Written Opinion dated Mar. 10, 2015 for PCT Application No. PCT/US2014/066050; 15 pages.

* cited by examiner

STRUCTURE AND TECHNIQUE FOR ANTENNA DECOUPLING IN A VEHICLE MOUNTED SENSOR

FIELD

The concepts, systems, circuits, devices and techniques described herein relate generally to radio frequency (RF) circuits and more particularly to a structure and technique for electrically decoupling an RF antenna from a surrounding conductive structure in a vehicle mounted sensor housing.

BACKGROUND

As is also known in the art, an automotive sensor utilizing radio frequency (RF) signals to perform detection typically includes and RF antenna disposed within a sensor housing. Such a system is described in U.S. Pat. No. 6,501,415 assigned to the assignee of the present application.

As is also known, the sensor (and in particular the antenna within the sensor) typically interacts with its immediate environment. This interaction can cause disturbances of radiated fields which lead to degraded and unpredictable performance of the sensor.

To reduce, or ideally minimize, the interaction of the antenna within the sensor with its immediate environment, prior art techniques utilize either an RF absorptive foam or an RF shield disposed externally about the sensor. That is, prior art techniques typically utilize external absorptive materials (e.g. an RF absorptive plastic or other RF absorptive materials external to the sensor housing or outside the antenna box). Such an approach is illustrated in application number DE 102009042285 A1. Such an approach requires careful design of mounting/placement of the sensor behind fascia of a vehicle on which the sensor is mounted.

Furthermore, use of RF absorptive material (or more simply "absorber") external to the sensor housing (and thus external to an antenna disposed in the sensor housing) usually requires a large amount of absorber to achieve the desired result. This, of course, adds size, weight and cost to the sensor. And while careful placement of external absorber can achieve the desired result, this is often difficult to control and is not always successful for every application.

Other approaches, such as that described in U.S. Pat. No. 6,496,138, describe various matching/lens techniques, to utilize a vehicle bumper as a radome for the sensor. Again, attaching absorber to the bumper (i.e. absorber external to the sensor) is suggested as part of this technique.

EP 1674882 describes a system which redirects and absorb reflections from a distant target to reduce multi-path target returns. This is accomplished by selecting a shape of a frame and applying absorber only on the surface of these shapes. As described in EP 1674882A1, this approach reduces reflections (multi-path) from close targets. The specially shaped frame is designed to direct reflected waves away from the antennas. An absorbing material can be disposed over the shaped frame to further reduce reflections and absorbing materials can be disposed on the radome to still further reduce reflections.

SUMMARY

In accordance with the concepts, structures and techniques described herein, a radar sensor adapted for coupling to a vehicle (such as a car, truck, motorcycle or any other type of vehicle) includes a sensor housing having an radome forming one side (or face) thereof. An antenna printed circuit board (PCB) is disposed in the sensor housing. The antenna PCB includes an antenna positioned to radiate through the radome face of the sensor housing. A radio frequency (RF) absorbing frame (sometimes simply referred to herein as a "frame") is disposed internal to the sensor housing and is disposed on at least a portion of the perimeter the antenna PCB on the same surface of the antenna PCB as the antenna. At least one side of the RF absorbing frame proximate the antenna is provided having a wedge shaped cross-sectional shape. The wedge shape described herein provides a smooth transition into the RF absorptive frame so that RF energy from the antenna is absorbed along the surface of the antenna and/or antenna PCB to reduce coupling to conductive structures around the sensor including but not limited to conductive portions of a vehicle on which the sensor is mounted. Furthermore, by absorbing RF energy and electrically de-coupling the antenna from surrounding conductive structures, the wedge shaped RF absorptive frame described herein reduces amplitude and phase ripple and thus enables the sensor to operate with a wide field FOV (e.g. a FOV in the range of 150 degrees).

With this particular arrangement, a sensor which is electrically decoupled from a surrounding mounting structure is provided. In one embodiment, the RF absorbing frame is provided as a single unitary piece having an RF absorptive characteristic. In one embodiment, the RF absorbing frame is provided as a molded absorptive plastic part. Since the entire part is provided from a material having an RF absorption characteristic, it is not necessary to apply an absorptive coating to the frame. The frame absorbs RF energy along the surface of the antenna to reduce coupling to external conductive structures (e.g. a surface of a vehicle).

In one embodiment, the wedge-shaped portion of the RF absorbing frame is arranged such that a thin edge of the wedge-shaped portion is proximate the antenna and a thick edge of the wedge-shaped portion is distal the antenna (or stated differently, the wedge-shaped portion is facing the antenna). By positioning the thin edge of the wedge-shaped portion of the RF absorbing frame toward the antenna, the wedge-shaped portion of the RF absorbing frame provides a smooth physical and electrical transition such that RF energy from the antenna and propagating along the surface of the antenna and antenna PCB is absorbed by the wedge-shaped portion of the frame along the surface of the antenna and antenna PCB. This reduces the amount of RF energy coupled directly from the antenna to conductive elements external to the sensor.

Furthermore the RF absorbing frame is provided having a shape to ideally maximize FOV (Field of View) and to ideally minimize pattern distortions. In one embodiment, the beams which make up the frame are provided having a wedge cross-sectional shape. In one embodiment, the RF absorbing frame is disposed over the antenna PCB to also serve as a clamp for the antenna PCB within the sensor housing. Thus, the approach described herein results in a sensor which utilizes structures completely internal to the sensor housing to achieve electrical decoupling between a sensor antenna and conductive structures external to the sensor housing.

The RF absorbing frame internal to the sensor housing achieves the desired result of decoupling the sensor (and in particular the antenna within the sensor housing) from a surrounding electrically conductive structure without the use of any external absorber material. By reducing coupling between the antenna and its surroundings the internal RF absorbing wedge-shape frame thereby reduces pattern and phase ripple.

Unlike prior art techniques, in accordance with the wedge-shape RF absorbing frame structures, concepts, and techniques described herein, the wedge-shaped frame itself is made of RF absorbing material (rather than simply applying RF absorber material to the surfaces of the frame). Since the frame is comprised of RF absorbing material, every exposed edge of the frame includes RF absorbing material. Also, since the wedge-shaped frame itself is made of RF absorbing material, when the frame is disposed on a surface of the antenna PCB, RF absorbing material is applied directly to the antenna PCB (via surfaces of the frame). Furthermore, in accordance with the present concepts described herein, the frame is provided having a shape and is positioned so as to not obstruct the field of view (FOV) for the antenna.

In accordance with a further aspect of the concepts described herein, a sensor includes a housing and an antenna printed circuit board (PCB) disposed within the housing. The antenna PCB includes an antenna positioned to radiate through one face of the sensor housing. At least one wedge-shaped RF absorbing element is disposed internal to the sensor housing on the same surface of the antenna PCB as the antenna.

In one embodiment, the wedge shaped element is provided from a radar absorbing material such as a carbon-loaded plastic absorptive of RF energy at an RF frequency which is the same as the RF frequency at which the antenna operates (e.g. 24 GHz).

In one embodiment, the wedge-shaped element is arranged such that a thin edge of the wedge-shaped element is proximate the antenna and a thick edge of the wedge-shaped element is distal the antenna (or stated differently, the wedge-shaped element is disposed on the antenna PCB such that it is facing the antenna). By positioning the thin edge of the wedge-shaped element toward the antenna, the wedge-shaped element provides a smooth physical and electrical transition such that RF energy from the antenna and propagating along the surface of the antenna and antenna PCB is absorbed by the wedge-shaped element along the surface of the antenna and antenna PCB. This reduces the amount of RF energy coupled directly from the antenna to conductive elements external to the sensor. The wedge shape element thus provides a smooth transition so that RF energy emanating directly from the antenna is absorbed along the surface of the antenna. This reduces coupling of RF energy from the antenna to conductive elements around the sensor housing. This includes, but is not limited to conductive portions of a vehicle on which the sensor housing is mounted. Furthermore, by absorbing RF energy and thus electrically de-coupling the antenna from conductors proximate the sensor housing, the wedge-shaped RF absorptive element reduces amplitude and phase ripple and thus enables the sensor to operate with a wide field FOV (e.g. a FOV in the range of 150 degrees). In preferred embodiments, a plurality of wedge-shaped RF absorbing elements are disposed about the antenna. In one embodiment, a pair of wedge-shaped RF absorbing elements are disposed on opposing sides of a printed circuit micro-strip antenna provided on a surface of the antenna PCB.

Thus, the wedge-shaped RF absorbing element and the RF absorbing frame having wedge-shaped portions described herein achieve the desired result of decoupling the sensor from a surrounding electrically conductive structure without the use of any external absorber material.

This interaction can cause disturbances of radiated fields which lead to degraded and unpredictable performance of the sensor especially with regard to a sensor phase curve characteristic which is a very sensitive sensor parameter.

Furthermore, the approach described herein avoids the need to specially shape the frame of the antenna. This results in an antenna having lower manufacturing costs than in prior art approaches such as that described in EP1674882

In one embodiment, the wedge-shaped element or the wedge-shaped portions of the RF absorbing frame or the entire RF absorbing frame may be provided from a carbon loaded material. In one embodiment, the wedge-shape element or the wedge-shaped portions of the RF absorbing frame or the entire RF absorbing frame may be provided from a carbon loaded plastic material. In still other embodiments, the wedge-shaped element or the wedge-shaped portions of the RF absorbing frame or the entire RF absorbing frame may be provided from RF absorptive materials such as carbon loaded silicon, for example.

By including an RF absorbing wedge-shaped frame or element internal to the sensor, a sensor having lower cost, less weight, and smaller size than conventional sensors utilizing external absorber is provided. By utilizing an RF absorbing wedge-shaped frame or element, sensors provided in accordance with the concepts described herein have both a smaller number of parts and physically smaller parts than conventional sensors. Furthermore, the sensors are less sensitive to placement and mounting and provide improved FOV performance compared with prior art sensors having external absorber.

In general overview, a wedge-shape frame or element provided from radar absorptive material (RAM) has been designed to be internal to a sensor while at the same time replicating the function provided by external RF absorptive foam disposed about a sensor. The wedge-shape frame or element reduces (or ideally minimizes) undesirable electrical interaction of the sensor with its immediate environment. This interaction can cause disturbances of radiated fields which lead to degraded and unpredictable performance especially with regard to the sensor phase curve which is a very sensitive parameter. Reducing the coupling of an antenna to its surroundings reduces effects such as pattern and phase ripple.

The RF absorbing wedge-shape frame or element described herein can benefit any automotive radar sensor including those operating in the range of 24 GHz radar, and particularly those automotive radar sensors having antenna designs which provide a wide FOV. Blind spot detection, lane change, CTA, and park slot measurement are some of the specific applications that can benefit from using the concepts, structure and techniques described herein.

In contrast to prior art approaches which utilize an absorptive plastic external to the sensor housing, the concepts, system and techniques described herein utilizes an RF absorptive wedge-shape structure internal to the sensor housing. This internal absorptive wedge-shape structure negates the need to use any external structures or materials.

Moreover, in contrast also to prior art approaches utilizing a bumper and attaching absorber to the bumper along with using various matching/lens techniques, as a radome for the sensor, in one embodiment the absorptive wedge-shape structure is provided as: (1) a single molded absorptive plastic part (not an absorptive coating); (2) is completely internal to the sensor housing; (3) absorbs RF energy along the surface of the antenna to reduce coupling to vehicle; (4) is shaped to maximize FOV while at the same time minimizing pattern distortions; and (5) is placed over the antenna to also serve as a clamp for the antenna.

In accordance with a further aspect of the concepts, structures and techniques described herein, a sensor includes a housing and an antenna printed circuit board (PCB) disposed within the housing. The antenna PCB includes an antenna positioned to radiate through one face of the sensor housing with the antenna provided from a primary patch radiator and a secondary patch radiator coupled to the primary patch radiator (with such a configuration referred to herein as a "dual element radiator"). The sensor further includes at least one wedge-shaped RF absorbing element disposed internal to the sensor housing on the same surface of the antenna PCB as the antenna.

In one embodiment, the secondary patch radiator is smaller than the primary patch radiator and the secondary patch radiator. In one embodiment, the primary patch radiator is coupled to the secondary patch radiator via a transmission line. The function of dual element radiator design is to slightly narrow a radiating pattern of an array antenna. With this approach, an optimum combination of the radiator (including a single element radiator—e.g. a single patch—or the above-described dual element radiator) and the wedge shape absorber can provide a sensor having low ripple (ideally the lowest ripple) with reduced reduction in FOV (and ideally, no reduction in FOV). Thus, in one aspect, the concept sought to be protected herein has two parts: (1) a wedge shaped RF absorbing element attached to the face of the antenna towards the out edges of the antenna; and (2) an antenna which includes an element which produces a radiation pattern having a beam width which is selected in combination with the wedge-shaped RF absorber element to provide a sensor having low phase ripple (ideally the lowest ripple) with a reduced reduction in FOV (and ideally no reduction in FOV).

It should be appreciated that primary patch radiator and a secondary patch radiators may be provided having any dimensions and may be coupled using any techniques which results in a dual element radiator which serves the function of narrowing a radiating pattern of an array antenna of which they are a part.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Described herein is a wedge-shape frame or element provided from radar absorptive material (RAM) and suitable for inclusion internal to an automotive sensor. The wedge-shape frame or element absorbs radio frequency (RF) energy thereby replicating functionality provided by external RF absorptive foam conventionally disposed about a sensor. The internal wedge-shape frame or element reduces (or ideally minimize) undesirable electrical interaction of the sensor with its immediate environment. This interaction can cause disturbances of radiated fields which lead to degraded and unpredictable performance especially with regard to the sensor phase curve which is a very sensitive parameter. Reducing the coupling of an antenna to its surroundings reduces effects such as pattern and phase ripple. Sensors having an internal RF absorbing wedge-shaped frame or element, have both a smaller number of parts and physically smaller parts than conventional sensors. Furthermore, such sensors are less sensitive to placement and mounting on a vehicle and provide improved field of view (FOV) performance compared with prior art sensors having external absorber.

Figure 1:
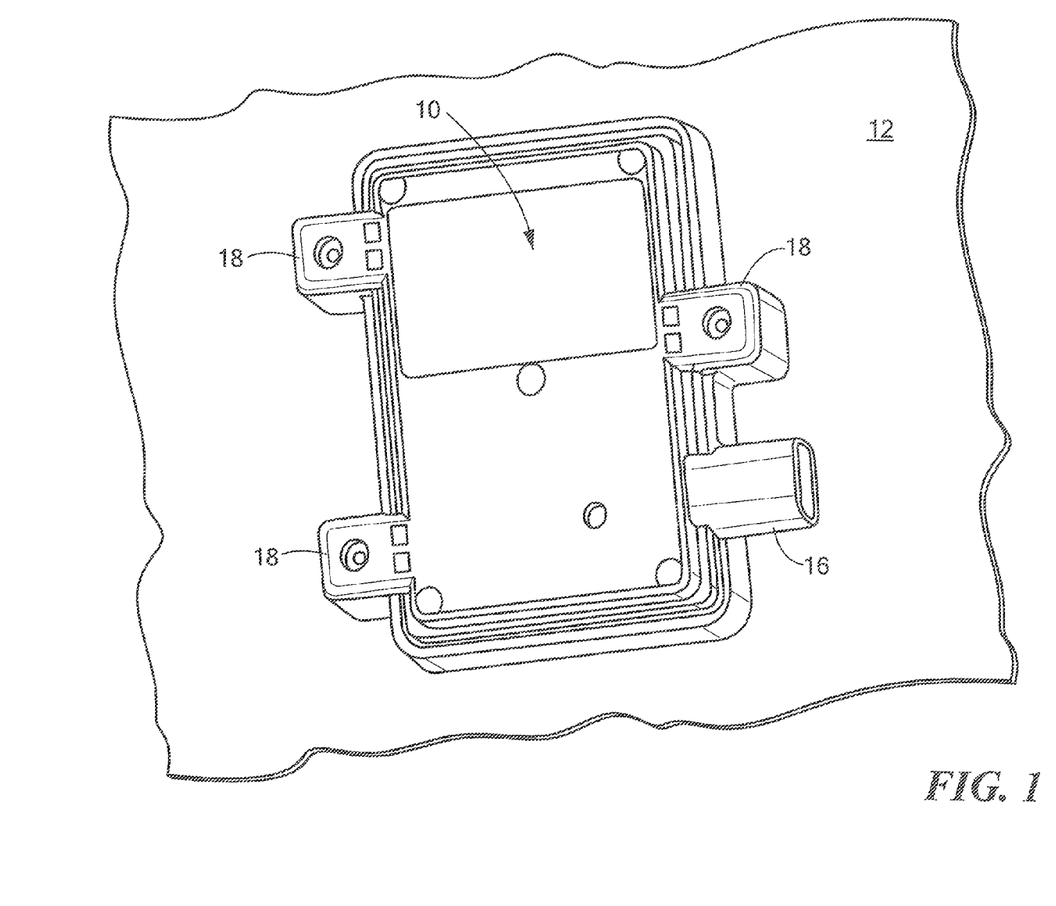
FIG. 1 is an isometric view of a radar system mounted to a vehicle.

Referring now to FIG. 1 a sensor 10 is mounted behind a portion of a vehicle body 12 which is typically provided as an electrically conductive structure. It should be appreciated, that sensor 10 can be mounted behind any portion of a vehicle (e.g. bumper or vehicle skin) provided that an appropriate amount of space exists or can be made to accommodate a sensor 10.

Sensors 10 can be provided as a highly integrated millimeter wave (MMW) radar sensors. Sensor 10 may be provided, for example, as the types described in U.S. Pat. No. 6,707,419 entitled Radar Transmitter Circuitry and Techniques, filed on Aug. 16, 2001, and U.S. Pat. No. 6,642,908 entitled Switched Beam Antenna Architecture, filed on Aug. 16, 2001, each of which are assigned to the assignee of the present invention and incorporated herein by reference. It should be appreciated of course that other radar systems can be used in accordance with the concepts, systems and techniques described herein.

Sensor 10 is mounted behind a vehicle portion which allows radio frequency (RF) energy to pass therethrough with relatively little, or ideally no, attenuation. For example sensor 10 can be mounted in a location of the vehicle having an opening to accommodate the sensor and allow the sensor a clear radiation path. Sensor 10 can be coupled to the vehicle via a mounting bracket (not shown) or can be coupled directly to a portion of the vehicle.

Figure 2:
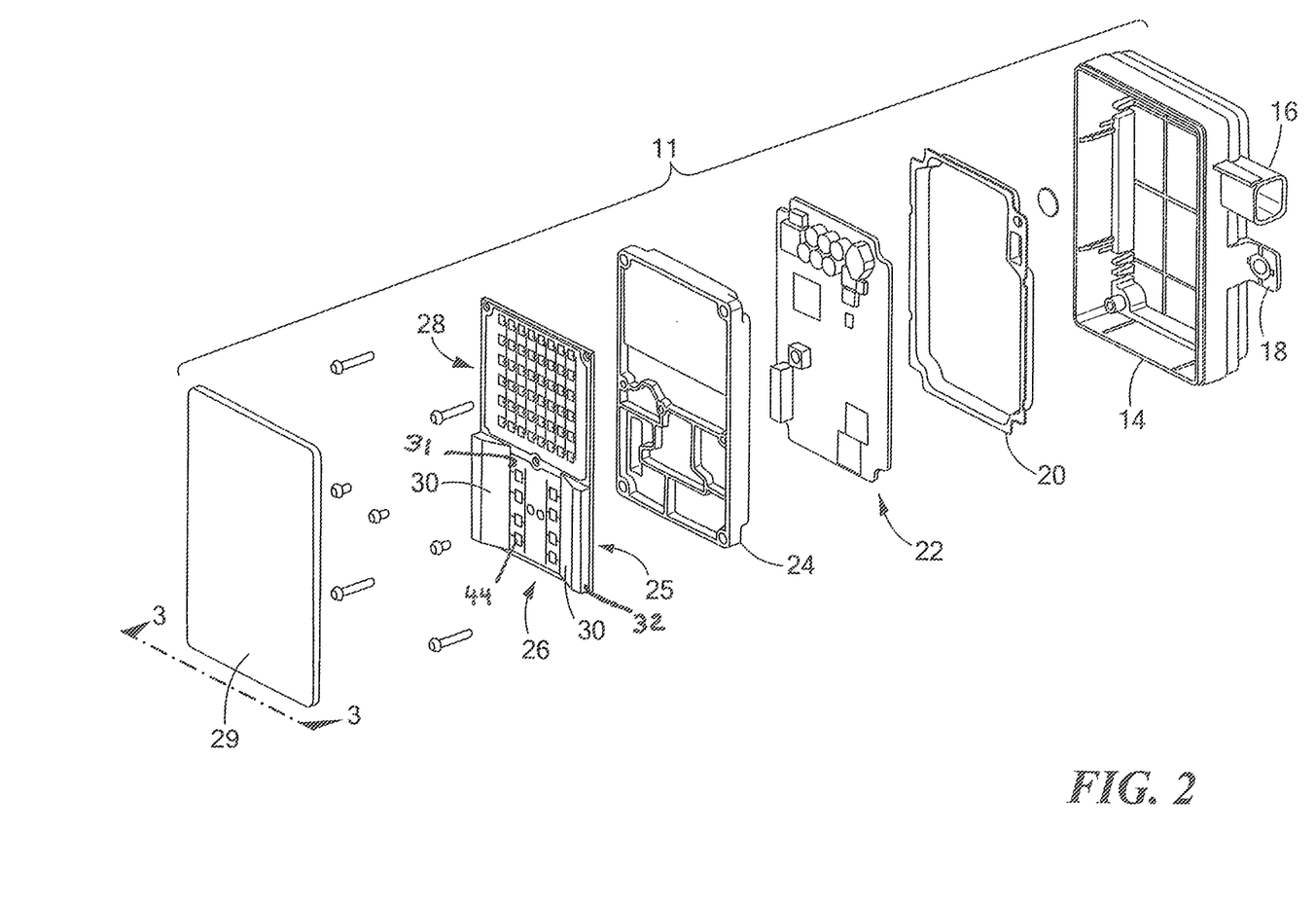
FIG. 2 is an exploded isometric view of a sensor having an internal wedge-shaped radio frequency (RF) absorber structure.
Figure 3:
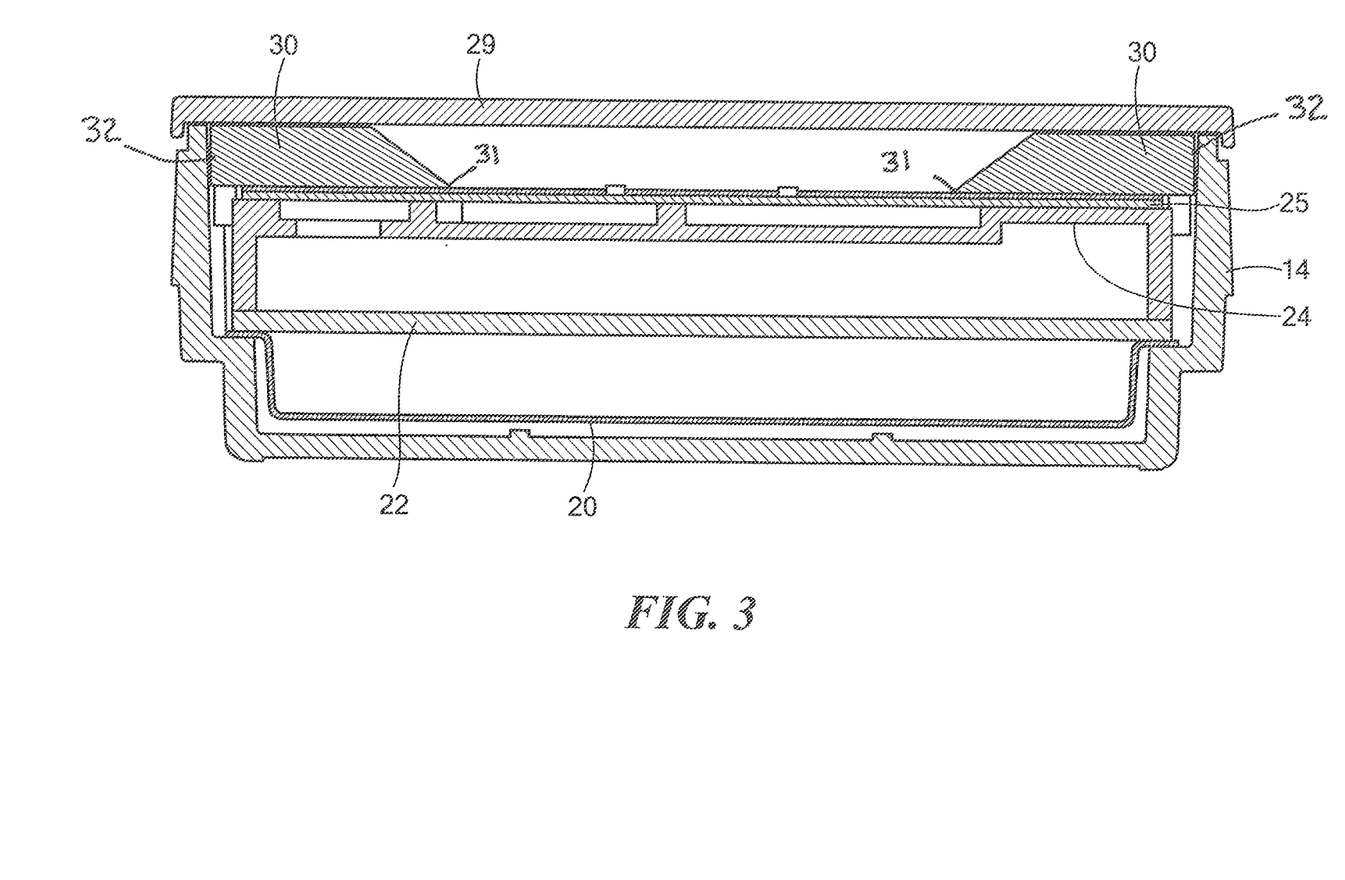
FIG. 3 is a cross-sectional view of the sensor of FIG. 2 take along lines 3-3 of FIG. 2.

Referring now to FIGS. 2 and 3 in which like elements are provided having like reference designations, a sensor 11 (which may be the same as or similar to sensor 10 in FIG. 1) is shown in exploded view. Sensor 11 includes a housing 14 having a connector port 16 and mounting ears 18. An RF shield is 20 is disposed in housing 14 and a printed circuit board (PCB) 22 having various electronics coupled thereto is disposed in housing 14 over RF shield 20. A support frame 24 is disposed over PCB 20 and an antenna PCB 25 is disposed over support frame 24. Antenna PCB has transmit and receive antennas 26, 28 disposed thereon. In the exemplary embodiment of FIG. 2, antennas 26, 28 are provided as array antennas comprised of elements 44. A radome 29 is disposed over antenna PCB 24. Radome 29 is provided from an RF transparent material and forms one face of sensor 11 through which antennas 26, 28 transmit and receive RF signals.

In the exemplary embodiment of FIG. 2, antennas 26, 28 are provided as printed circuit antennas and in particular are provided from a plurality of patch antenna elements 44. Thus antennas 26, 28 are provided as array antennas 26, 28. It will be appreciated, of course, that in some embodiments antennas 26, 28 need not be array antennas (e.g. antennas 26, 28 may be provided from a single element).

Also disposed on the first surface of antenna PCB about antenna 26 is at least one wedge-shaped RF absorbing element 30. It should be noted that wedge-shaped RF absorbing element 30 is mounted or otherwise disposed on the same surface of the antenna PCB as the array antennas 26 and thus is internal to sensor 11.

Preferably, the wedge-shaped RF absorbing element is arranged such that a thin edge 31 of the wedge-shaped element is proximate the antenna and a thick edge 32 of the wedge-shaped element is distal the antenna (or stated differently, the wedge-shaped element is disposed on the antenna PCB such that the thin edge is facing the antenna). By positioning the thin edge of the wedge-shaped element toward the antenna, the wedge-shaped element provides a smooth physical and electrical transition such that RF energy from the antenna and propagating along the surface of the antenna and antenna PCB is absorbed by the wedge-shaped element along the surface of the antenna and antenna PCB. This reduces the amount of RF energy coupled directly from the antenna to conductive elements external to the sensor.

In preferred embodiments, as shown in FIG. 2, a plurality of wedge-shaped RF absorbing elements 30 (here two wedge-shaped RF absorbing elements) are disposed about antenna 26. In the exemplary embodiment of FIG. 2, a pair of wedge-shaped RF absorbing elements are disposed on opposing sides of the printed circuit micro-strip antenna 26. When a sensor is provided having multiple wedge-shaped RF absorbing elements, it should be appreciated that the dimensions and/or angles of wedge faces for each of the wedge-shaped RF absorbing elements need not be the same.

By facing the thin edge of the wedge-shaped RF absorbing element toward the antenna, the wedge-shaped RF absorbing element provides a smooth transition to RF energy emanating from the antenna so that RF energy emanating directly from antenna 26 is absorbed along the surface of the antenna and antenna PCB. This reduces coupling of RF energy from the antenna to conductive elements external to the sensor. This includes, but is not limited to conductive portions of a vehicle on which the sensor is mounted. Furthermore, by absorbing RF energy and thus electrically de-coupling the antenna from conductors surrounding the sensor, the wedge shaped RF absorptive element reduces amplitude and phase ripple and thus enables the sensor to operate with a wide field FOV (e.g. a FOV in the range of 150 degrees).

Thus, the wedge-shaped RF absorbing element described herein achieves the desired result of decoupling the sensor from a surrounding electrically conductive structure without the use of any external absorber material.

Such interaction (i.e. sensor interaction with surrounding electrically conductive structures) can cause disturbances of radiated fields which lead to degraded and unpredictable performance of the sensor especially with regard to a sensor phase curve characteristic which is a very sensitive sensor parameter.

In one embodiment, the wedge-shape element may be provided from a carbon loaded material. In one embodiment, the wedge shaped element is provided from a radar absorbing material such as a carbon-loaded plastic absorptive of RF energy at an RF frequency which is the same as the RF frequency at which the antenna operates (e.g. 24 GHz). In some embodiments, RF absorptive materials such as carbon loaded silicon for example, may be used.

It should be noted that, and as will be described herein below in conjunction with FIGS. 4-4B, wedge-shaped RF absorbing element 30 may be provided as part of a wedge-shaped RF absorbing frame.

Figure 4:
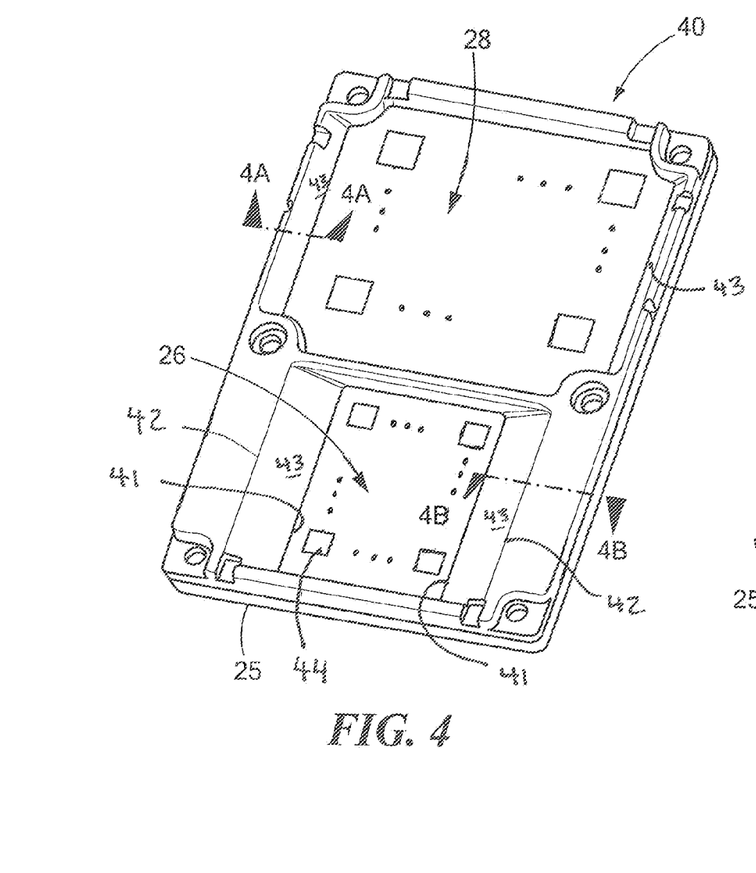
FIG. 4 is an isometric view of an RF absorbing wedge-shaped frame.
Figure 4A:
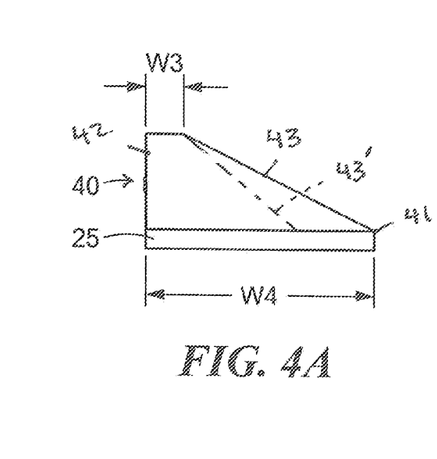
FIG. 4A is cross-sectional view of the RF absorbing wedge-shaped frame of FIG. 4 taken along lines 4A-4A of FIG. 4.
Figure 4B:
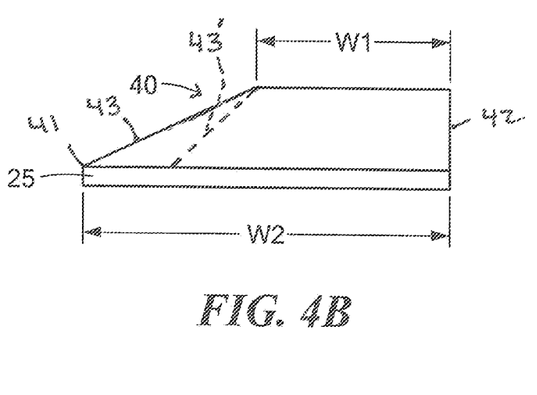
FIG. 4B is cross-sectional view of the RF absorbing wedge-shaped frame of FIG. 4 taken along lines 4B-4B of FIG. 4.

Referring now to FIGS. 4-4B, a wedge-shaped RF absorbing frame 40 (sometimes referred to herein as an "RF absorbing frame" or more simply as a "frame") is disposed internal to the sensor housing 11 (FIG. 2) and is disposed on at least a portion of the perimeter the antenna PCB 25 (FIG. 2, 4-4B) on the same surface of the antenna PCB as an antenna (e.g. antenna 26). At least one side of the RF absorbing frame proximate the antenna is provided having a wedge-shaped cross-sectional shape.

In one embodiment, the wedge-shaped portion of the RF absorbing frame is arranged such that a thin edge 41 of the wedge-shaped portion is proximate the antenna and a thick edge 42 of the wedge-shaped portion is distal the antenna (or stated differently, the thin edge of the wedge-shaped portion of the RF absorbing frame is facing the antenna). By positioning the thin edge of the wedge-shaped portion of the RF absorbing frame toward the antenna, the wedge-shaped portion of the RF absorbing frame provides a smooth physical and electrical transition such that RF energy from the antenna and propagating along the surface of the antenna and antenna PCB is absorbed by the wedge-shaped portion of the frame along the surface of the antenna and antenna PCB. This reduces the amount of RF energy coupled directly from the antenna to conductive elements external to the sensor. The wedge shape is selected to provide a smooth transition into the RF absorptive frame so that RF energy from the antenna is absorbed along the surface of the antenna to reduce coupling to conductive elements around the sensor including but not limited to conductive portions of a vehicle on which the sensor is mounted. As noted in FIGS. 4A, 4B, wedge faces 43 may be provided having angles selected to improve (and ideally optimize) sensor performance. For example, two different exemplary wedge faces 43 and 43' are shown in FIGS. 4A, 4B. It should also be appreciated that the dimensions and/or angles of wedge faces on different portions of the frame need not be the same.

In one embodiment for operation in the range of 24 GHz, the frame is provided having a thickness it the range of 3-4 mm and one portion of the frame has a wedge-shape with a first surface having a width W1 of 10 mm and a second surface having a width W2 of 16 mm and a different portion of the frame having a wedge-shape with a first surface having a width W3 of 1 mm and a second surface having a width W4 of 4 mm. Thus, it should be appreciated that in some embodiments, some portions of the frame may have a wedge-shape while other portions do not and that in other embodiments some portions of the frame may have a wedge-shape which is different than other portions of the frame.

By absorbing RF energy and electrically de-coupling the antenna from surrounding conductors, the wedge shaped RF absorbing frame reduces amplitude and phase ripple and thus enables the sensor to operate with a wide field FOV (e.g. a FOV in the range of 150 degrees).

In one embodiment, the RF absorbing frame is provided as a single unitary piece having an RF absorptive characteristic. In other embodiments, the frame may be assembled or otherwise provided from separate, multiple members. In one embodiment, the RF absorbing frame is provided as a molded absorptive plastic part. Since the entire part is provided from a material having an RF absorption characteristic, it is not necessary to apply an absorptive coating to the frame. The frame absorbs RF energy along the surface of the antenna to reduce coupling to an external structure (e.g. a surface of a vehicle). Furthermore the RF absorbing frame is provided having a shape to maximize antenna FOV and to minimize pattern distortions. In one embodiment, each of the beams which make up the frame are provided having a wedge cross-sectional shape. In other embodiments only portions of some of the beams which make up the frame are provided having a wedge cross-sectional shape. In one embodiment, the RF absorbing frame is disposed directly over the antenna PCB to also serve as a clamp for the antenna PCB within the sensor housing. Thus, the approach described herein results in a sensor which utilizes structures completely internal to the sensor housing to achieve decoupling between a sensor antenna and conductors external to the sensor housing.

The RF absorbing frame internal to the sensor housing achieves a desired result of decoupling the sensor (and in particular the antenna within the sensor housing) from a surrounding electrically conductive structure without the use of any external absorber material. Thus, the RF absorbing frame internal to the sensor housing reduces coupling between the antenna and its surroundings and thereby reduces pattern and phase ripple.

Unlike prior art techniques, in accordance with the wedge-shape RF absorbing frame structures, concepts, and techniques described herein, as noted above, the wedge-shaped frame itself is made of RF absorbing material (rather than simply applying RF absorber material to the surfaces of the frame). Since the frame is comprised of RF absorbing material, every exposed edge of the frame includes RF absorbing material. Also, since the wedge-shaped frame itself is made of RF absorbing material, when the frame is disposed on a surface of the antenna PCB, RF absorbing material is applied directly to the antenna PCB (via the frame). Furthermore, in accordance with the present concepts described herein, the frame is provided having a shape and is positioned so as to not obstruct the field of view (FOV) for the antenna.

Figure 5:
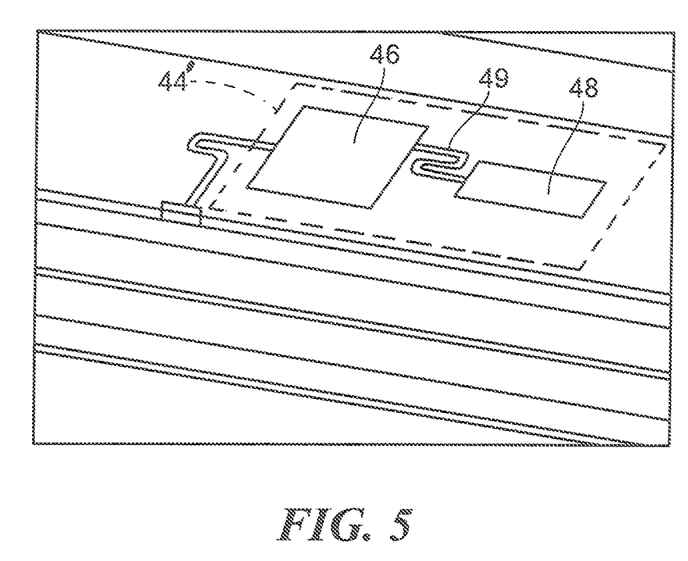
FIG. 5 is a top isometric view of a dual element radiator for controlling field of view.

Referring now to FIG. 5, an example of an antenna element 44' which may be of the type used in one or both of array antennas 26, 28 includes a primary patch radiator 46 and a secondary patch radiator 48 coupled to the primary patch radiator. This is referred to as a dual element radiator 44'. In the particular embodiment, shown in FIG. 5, the secondary patch radiator is smaller than the primary patch radiator and the secondary patch radiator is coupled to the primary patch radiator via a transmission line 49 (in this example, a micro-strip transmission line), but any coupling means may be used. The function of dual element radiator design is to slightly narrow a radiating pattern of an array antenna. It should be appreciated that primary patch radiator and a secondary patch radiators maybe provided having any dimensions and may be coupled using any techniques which results in a dual element radiator which serves the function of narrowing a radiating pattern of an array antenna of which they are a part.

It should be noted that an optimum combination of the radiator (including a single element radiator—e.g. a single patch—or the above-described dual element radiator) and the wedge shape absorber will give the lowest ripple with minimum reduction in FOV. Thus, in one aspect, the concept sought to be protected herein has two parts: (1) a wedge shaped RF absorbing element attached the face of the antenna towards the out edges of the antenna; and (2) an antenna which includes a dual element radiator.

Figure 6:
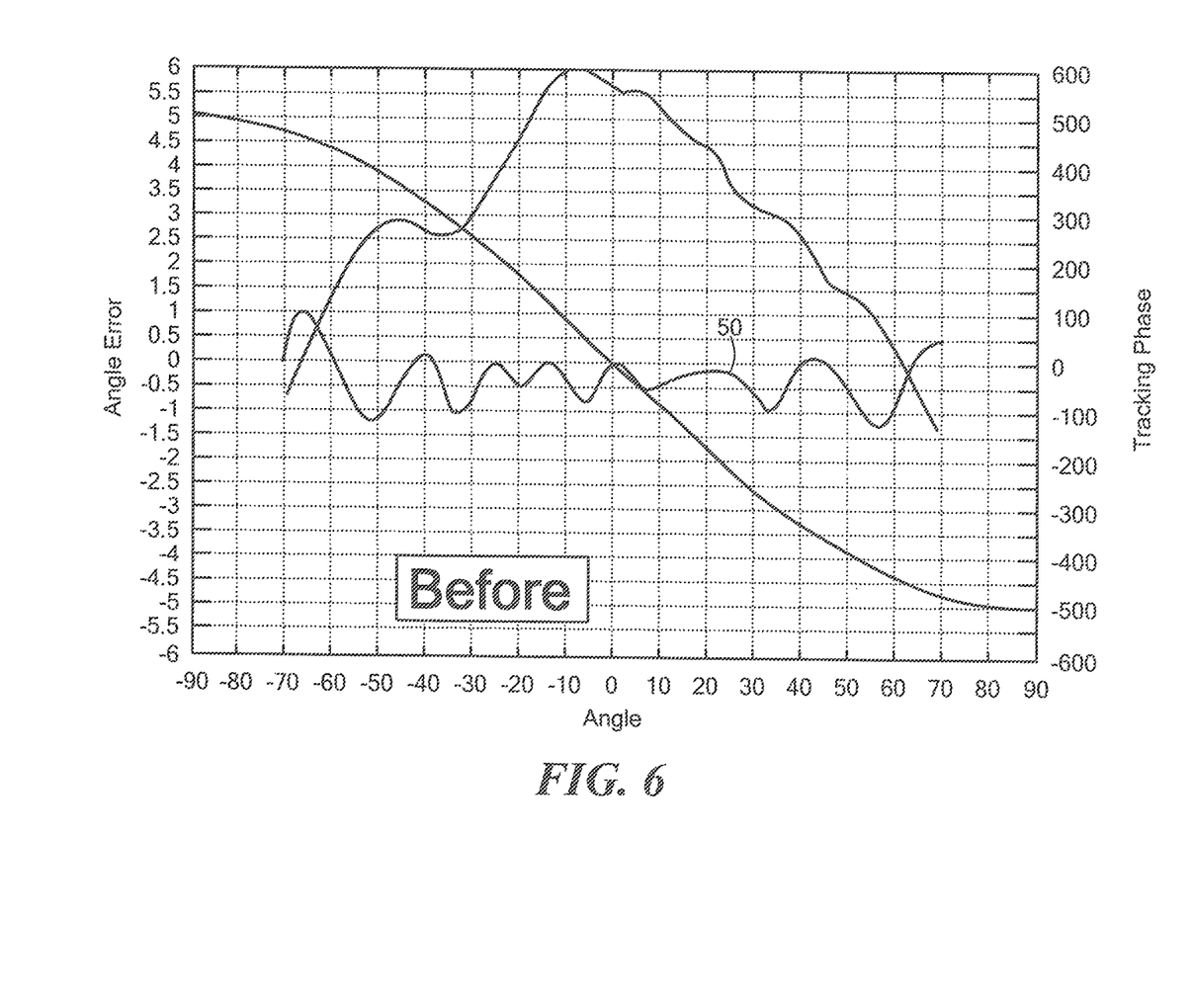
FIGS. 6 and 6A are plots of sensor amplitude and phase angle vs. angle (degrees) which illustrates phase and amplitude ripple before (FIG. 6) and after (FIG. 6A) inclusion of a wedge-shape RF absorber structure internal to the sensor.
Figure 6A:
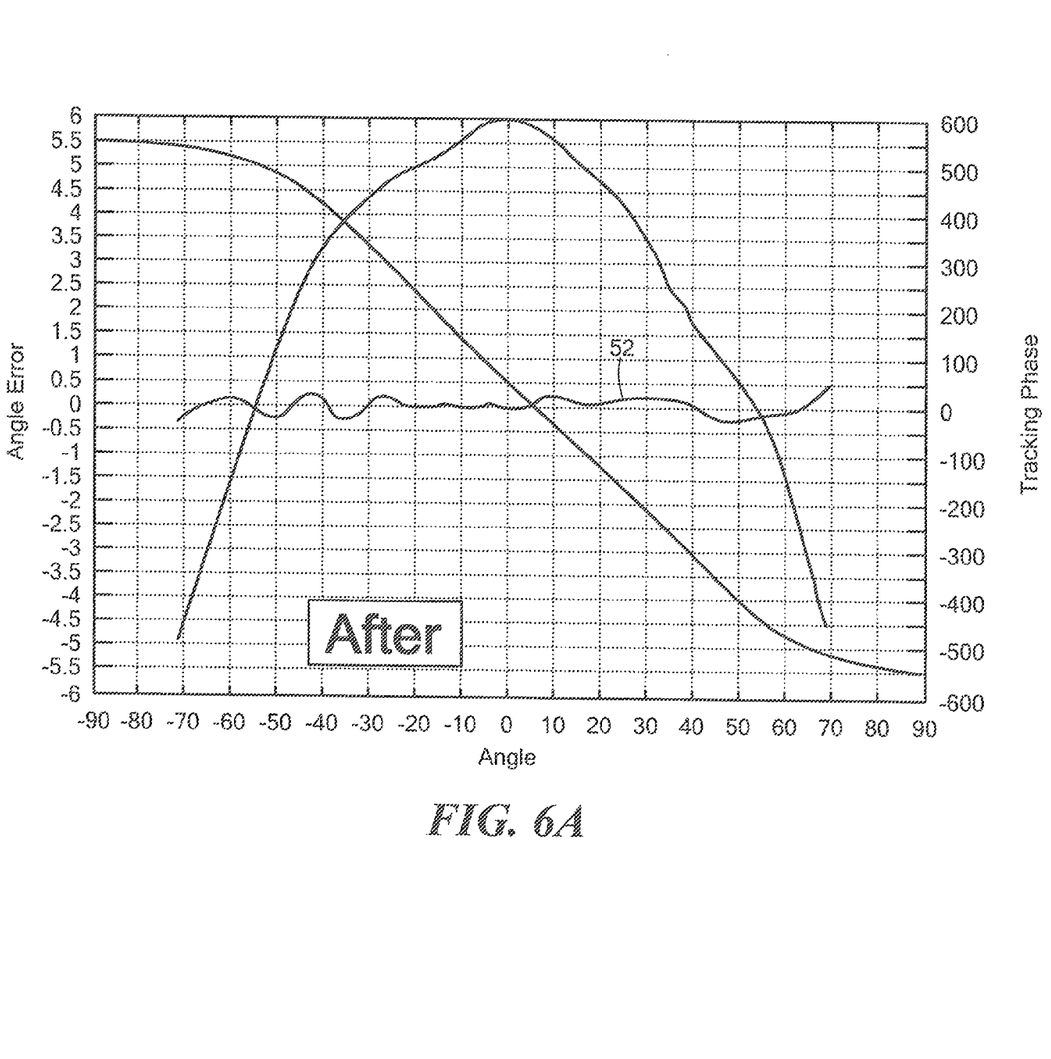

Referring now to FIGS. 6, and 6A, simulated results showing the reduction in phase ripple are shown. By comparing phase curves 50 (FIG. 6), 52 (FIG. 6A) one can see that ripple without the wedge-shaped RF absorber in the sensor (FIG. 6) is higher that the ripple which occurs with the wedge-shaped RF absorber internal to the sensor (FIG. 6A).

While particular embodiments of the present invention have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

I claim:

1. A radar sensor comprising:
   a housing having an radome forming one face thereof;
   an antenna printed circuit board (PCB) disposed in the housing;
   an antenna, disposed on the antenna PCB and positioned to radiate through the radome face of the housing; and
   a radio frequency (RF) absorbing frame disposed internal to the sensor housing and disposed on at least a portion of the perimeter the antenna PCB on the same surface of the antenna PCB as the antenna, said RF absorbing frame having a wedge-shaped portion proximate the antenna.

2. The radar sensor of claim 1 wherein the wedge-shaped RF absorbing frame is disposed such that RF energy from the antenna is absorbed along the surface of the antenna to reduce coupling to conductive elements external to the sensor.

3. The radar sensor of claim 1 wherein the wedge-shaped portion of the RF absorbing frame is arranged such that a thin edge of the wedge-shaped portion is proximate the antenna and a thick edge of the wedge-shaped portion is distal the antenna.

4. The radar sensor of claim 3 wherein the wedge-shaped portion of the RF absorbing frame is disposed such that RF energy from the antenna is absorbed by the wedge-shaped portion of the frame along the surface of the antenna to reduce coupling from the antenna to conductive elements external to the sensor.

5. The radar sensor of claim 1 wherein the antenna is provided from an array of antenna elements.

6. The radar sensor of claim 5 wherein the antenna elements are provided as a dual element radiator.

7. The radar sensor of claim 6 wherein the dual element radiator comprises:
   a primary patch radiator; and
   a secondary patch radiator coupled to the primary patch radiator wherein the secondary patch radiator is provided having dimensions which are smaller than the dimensions of the primary patch radiator.

8. The radar sensor of claim 7 wherein the primary patch radiator is coupled to the secondary patch radiator via a transmission line.

9. A radar sensor comprising:
a housing having a radome forming one face thereof;
an antenna printed ciruit board (PCB) disposed in the housing;
an antenna disposed on the antenna PCB and positioned to radiate through the radome face of the housing; and
a radio frequency (RF) absorbing frame disposed internal to the sensor housing and disposed on at least a portion of the perimeter the antenna PCB on the same surface of the antenna PCB as the antenna, said RF absorbing frame having a wedge-shaped portion proximate the antenna wherein some portions of the RF absorbing frame have a wedge-shape while other portions of the RF absorbing frame do not have a wedge-shape and wherein the wedge-shaped portion of the RF absorbing frame is arranged such that a thin edge of the wedge-shaped portion is proximate the antenna and a thick edge of the wedge-shaped portion is distal to the antenna.

10. The radar sensor of claim 9 wherein some portions of the frame have a first wedge-shape while other portions of the frame have a second, different wedge-shape.

11. The radar sensor of claim 9 wherein the frame is disposed over the antenna PCB and secures said clamps the antenna PCB to the housing.

12. A radar sensor comprising:
a housing having an radome forming one face thereof;
an antenna printed circuit board (PCB) disposed in the housing;
an antenna, disposed on the antenna PCB and positioned to radiate through the radome face of the housing; and
a first wedge-shaped (RF) absorbing element disposed on at least a portion of the antenna PCB on the same surface of the antenna PCB as the antenna and proximate to the antenna such that RF energy from the antenna is absorbed along the surface of the antenna to reduce coupling from the antenna to conductive elements external to the sensor wherein some portions of the RF absorbing frame have a wedge-shape while other portions of the RF absorbing element do not have a wedge-shape and wherein the wedge-shaped portion of the RF absorbing element is arranged such that a thin edge of the wedge-shaped portion is proximate the antenna and a thick edge of the wedge-shaped portion is distal the antenna.

13. The radar sensor of claim 12 wherein the wedge-shaped portion of the RF absorbing frame is disposed such that RF energy from the antenna is absorbed by the wedge-shaped portion of the frame along the surface of the antenna to reduce coupling from the antenna to conductive elements external to the sensor.

14. The radar sensor of claim 12 further comprising a second wedge-shaped (RF) absorbing element disposed on at least a portion of the antenna PCB on the same surface of the antenna PCB as the antenna and proximate to the antenna such that RF energy from the antenna is absorbed along the surface of the antenna to reduce coupling from the antenna to conductive elements external to the sensor.

15. The radar sensor of claim 14 wherein the first wedge-shaped (RF) absorbing element is disposed on a first side of the antenna and the second wedge-shaped (RF) absorbing element is disposed on a second side of the antenna.

16. The radar sensor of claim 15 wherein the antenna is provided as an array antenna comprising antenna elements provided as a dual element radiators.

17. The radar sensor of claim 16 wherein the dual element radiator comprises:
a primary patch radiator; and
a secondary patch radiator coupled to the primary patch radiator wherein the secondary patch radiator is provided having dimensions which are smaller than the dimensions of the primary patch radiator.

18. The radar sensor of claim 17 wherein the primary patch radiator is coupled to the a secondary patch radiator via a transmission line.

* * * * *